(12) United States Patent
Stolle

(10) Patent No.: US 6,256,987 B1
(45) Date of Patent: Jul. 10, 2001

(54) HYDRAULIC OPERATING APPARATUS

(75) Inventor: Klaus Stolle, Schwabniederhofen (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/369,329

(22) Filed: Aug. 6, 1999

(30) Foreign Application Priority Data

Aug. 7, 1998 (AT) .................................................. 1369/98

(51) Int. Cl.⁷ .................................................. F16D 31/02
(52) U.S. Cl. .................................. 60/476; 60/484; 296/107
(58) Field of Search .......................... 60/473, 475, 476, 60/484; 91/530; 296/107

(56) References Cited

U.S. PATENT DOCUMENTS 3,126,706 * 3/1964 Dettinger ................................. 60/476
4,343,153 * 8/1982 Kern et al. ............................... 60/476
5,067,768 * 11/1991 Fischbach ............................ 296/107
5,666,809 * 9/1997 Mentink .................................. 60/484

* cited by examiner

Primary Examiner—Edward K. Look
Assistant Examiner—Michael Leslie
(74) Attorney, Agent, or Firm—Dykema Gossett PLLC

(57) ABSTRACT

A hydraulic operating apparatus, especially for a vehicle covering, includes a reversible pump (2) which, via hydraulic lines (3, 4), one of which is in all cases provided with an unblockable check valve (7), is connected with the working chambers of at least one double-acting piston-cylinder arrangement (1). In order to make possible a very flexible supply and control of mutually independently operated piston-cylinder arrangements with a minimum of constructive and control-technical effort, additional hydraulic lines (10, 11) branch off from both hydraulic lines (3, 4) of the reversible pump, into which the check valves are placed, which additional hydraulic lines lead into a common hydraulic line (12) to at least one additional piston cylinder arrangement (13, 14).

8 Claims, 1 Drawing Sheet

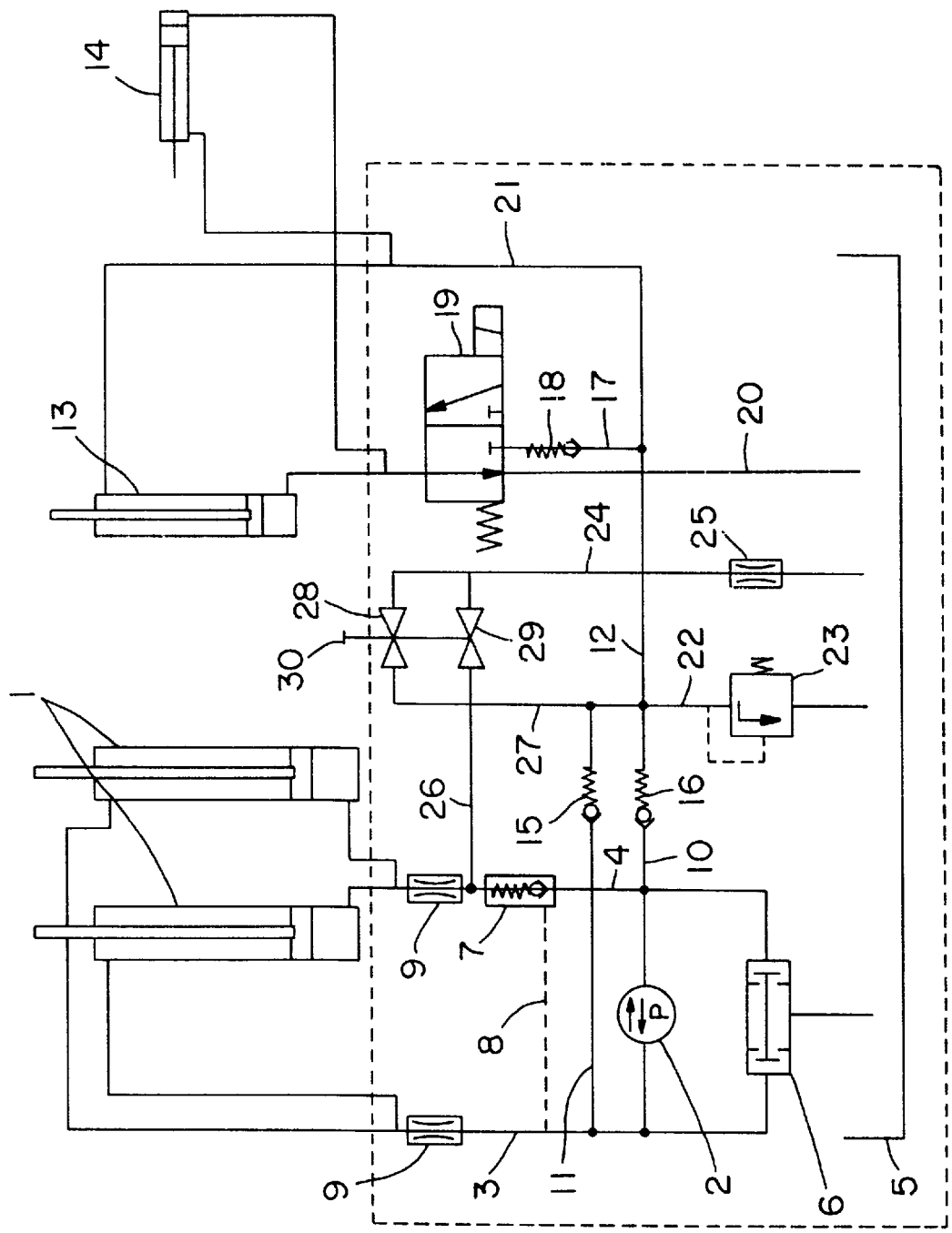

HYDRAULIC OPERATING APPARATUS

BACKGROUND OF THE INVENTION

1. Field of the Invention

The invention relates to a hydraulic operating apparatus, especially for a vehicle covering, having a reversible pump which, via hydraulic lines, one of which is in all cases provided with an unblockable check valve, is connected with the working chambers of at least one double-acting piston-cylinder arrangement.

2. The Prior Art

AT 396.613 discloses an operating apparatus for vehicle coverings wherein the valve-stem side and piston side working chambers of two piston-cylinder arrangements are controlled from both outlets of a reversible pump in order to extend and pull in the covering. The different volumes are balanced out from the reservoir of the hydraulic medium as controlled via a change-over valve. For achieving an emergency stopping function which, depending on demand, can be provided on one or also on both sides, a check valve is employed in one of the hydraulic line. This check valve is unblocked by the pressure in the system at normal operation.

In addition to the operation of the covering itself, an automatic operation of the covering of the cover and/or of its locking mechanism is increasingly desired. For this purpose, further piston-cylinder arrangements are provided which are either supplied via an additional, separate hydraulic circle or are controlled by the main pump of the system via suitable line, valve and control arrangements and the like. Both variants require a relatively large constructive and control-technical effort and increase both the weight and cost of the device.

Thus the object of the present invention is to provide a hydraulic operating apparatus of the above-mentioned type with which, in a simple manner and with a minimum of constructive and control-technical effort, a flexible supply and control of mutually independently operated piston-cylinder arrangements is possible.

SUMMARY OF THE INVENTION

This problem is solved according to the invention in that additional hydraulic lines branch off from both outlet line of the reversible pump, are placed into the check valves, which additional hydraulic lines lead into a common hydraulic line to at least one additional piston cylinder arrangement. In this manner, a pressurized hydraulic medium for the control of the additional piston-cylinder unit, such as for the movement of the covering cap and/or the locking cylinder present in all cases, is available without the need for additional complete hydraulic circle or costly control valve arrangements, being independent of the direction of rotation of the reversible pump and thus independent of the movement of the first piston-cylinder arrangement such as for the movement of the covering itself.

A very simple construction can be realized for the independently controllable pulling-inward or extending-outward of the additional piston-cylinder unit by also making the additional piston-cylinder arrangement double-acting, by dividing the common hydraulic line into two supply lines to both of the working chambers of the additional piston-cylinder arrangement and by providing a change-over valve in one supply line for leading the corresponding working chamber away into a reservoir or for the supply with hydraulic medium from a supply line. The independent controllability of the at least one additional piston-cylinder arrangement is thus only realizable with one change-over valve.

If, according to a further characteristic of the invention, a check valve is placed into the supply line to the change-over valve, an emergency stopping function can be also guaranteed for the at least one additional piston-cylinder arrangement and the uncontrolled falling-back, for example, of the covering cap or the pulling-inward of the locking cylinder upon failure of the hydraulic system can be prevented.

It can be advantageously provided that a derivative line branches off into the reservoir from the common hydraulic line, in which derivative line a pressure-limiting valve is placed. In so doing, the system pressure can be completely limited and thus a damaging of its parts as well as of the covering and its aid components.

To allow for a manual emergency operation of the additional piston-cylinder arrangement or of the parts normally moved by it, for example, in the course of the opening and/or closing of the covering, a blockable derivative line branches off from the common hydraulic line into the reservoir in which a throttle valve is placed. In a failure of the hydraulic system and, for example, a manual opening of the derivative line, the affected parts, such as those burdened by its weight, can slowly sink back into their resting position against the resistance of the throttle valve.

According to a further characteristic of the invention, into a derivative line, a blockable line empties as preferably coupled with the former, which blockable line originates from the hydraulic line between the reversible pump and the piston-cylinder arrangement, preferably from a position between a check valve present in all cases and the piston-cylinder arrangement. Thus, in the case of the necessity of an emergency manual operation, it is provided that all normally hydraulically moved parts are manually operated together, for example, a covering itself and all components belonging to it, such as locking cylinders, covering caps, locking mechanisms and the like.

BRIEF DESCRIPTION OF THE FIGURE

In the following description, the invention is explained in more detail with reference to the accompanying FIGURE, which diagrammatically depicts a preferred embodiment of the invention.

DETAILED DESCRIPTION OF THE PREFERRED EMBODIMENT

As indicated in the FIGURE, two double-acting hydraulic piston-cylinder arrangements 1 serve for the hydraulic operation of the main components of the system, such as of the covering of the vehicle. They are supplied by a reversible pump 2 with preferably hydraulic oil which is lead to the rod sides of the piston-cylinder arrangement 1 via a hydraulic line 3 and the piston sides via a hydraulic line 4. For the equilibrium of the different volumes of piston and rod side, hydraulic oil is suctioned out of the reservoir 5 via a change-over valve 6 or lead away. The check valve 7 in the hydraulic line 4 on the piston side of the piston-cylinder arrangements 1 ensures the emergency stopping function upon failure of the hydraulic system and is unblocked via a control line 8 during normal operation. Finally, two more throttle valves 9 are placed into the hydraulic lines 3, 4.

In order to be able to hydraulically operate, in addition to the covering itself, also, for example, its covering cap and locking mechanisms, an additional hydraulic line 10 and 11 branches off from each hydraulic line 3 or 4, which additional hydraulic lines then unite to a common hydraulic line 12 which supply the additional piston-cylinder arrangements 13 and 14 with hydraulic medium. By means of the check valves 15 and 16 blocked in the direction towards the pump 2 in the additional hydraulic lines 10 and 11, it is ensured that, independent of the direction of rotation of the pump 2, the hydraulic line 12 is always impacted with pressure.

The piston sides of the additional piston-cylinder arrangements 13 and 14 are supplied via one supply line 17 branched off from the common hydraulic line 12 with a built-in check valve 18 for the achievement of an emergency stopping function, whereas leading it occurs via the preferably electrically operated change-over valve 19, preferably a 3/2-way valve. This change-over valve 19 in the illustrated position leads the piston sides via the line 20 away into the reservoir 5, through which, by means of the hydraulic medium lead to the valve-stem sides of the piston-cylinder arrangements 13 and 14 independently of the direction of the operation of the piston-cylinder arrangements 1 via the supply line 21, the piston stems are pulled inward. In the second switching position, additionally the piston sides are supplied with hydraulic medium, through which, based on the difference in the effective surface on piston or valve-stem side, the piston-cylinder arrangements 13, 14 extend outward differentially.

From the common hydraulic line 12, a line 22 branches off to the reservoir 5, in which a pressure-limiting valve 23 is placed. If the pressure in the hydraulic system become too large due to a malfunction or through the running-up of one of the hydraulically operated parts, the hydraulic medium is lead away into the reservoir 5 and thus the maximal pressure on the value set at the valve 23 is limited.

In order to be able to manually move the normally automatically operated parts, the hydraulic medium can be lead away from the piston side of the piston-cylinder arrangements 13 and 14 as well as from both working chambers of the piston-cylinder arrangements 1 via a line 24 with a built-in throttle valve 25 into the reservoir 5. The piston sides of the piston-cylinder arrangements 13, 14 are, after all, lead away via the line 20 into the reservoir 5. Into the line 24, emptied are the line 26 which starts off from the hydraulic line 4 between the piston-cylinder arrangements 1 and the check valve 7, as well as line 27 which branches off from the common hydraulic line 12 to the additional piston-cylinder arrangements 13, 14. The blocking organs 28, 29 of both lines 26, 27 are preferably but not necessarily coupled with one another and to be operated via the operating element 30.

Of course, all parts of the hydraulic system, with the exception of the piston-cylinder arrangements and the hydraulic lines, can be assembled into a compact unit and built in centrally in the vehicle, as is symbolized by the dotted line in the FIGURE.

I claim:

1. A hydraulic operating apparatus comprising:
    a double-acting first piston-cylinder assembly which defines a piston chamber and a rod chamber therein,
    a reversible pump,
    a first hydraulic line connecting said reversible pump with said rod chamber,
    a second hydraulic line connecting said reversible pump with said piston chamber,
    an unblockable first check valve located in one of said first and second hydraulic lines,
    a second piston-cylinder assembly,
    a third hydraulic line for supplying hydraulic medium to said second double-acting piston-cylinder assembly,
    a fourth hydraulic line connecting said first hydraulic line with said third hydraulic line,
    a fifth hydraulic line connecting said second hydraulic line with said third hydraulic line, and
    second and third check valves respectively located in said fifth and sixth hydraulic lines.

2. A hydraulic operating apparatus according to claim 1, wherein said second piston-cylinder assembly is a double-acting piston-cylinder assembly defining a piston chamber and a rod chamber therein; and further including first and second supply lines connecting said third hydraulic line with said piston chamber and said stem chamber of second piston-cylinder assembly, respectively; a reservoir for hydraulic medium; and a change-over valve located in one of said first and second supply lines for controlling flow of hydraulic medium into the second piston-cylinder assembly or into the reservoir.

3. A hydraulic operating apparatus according to claim 2, wherein said change-over valve is located in said first supply line, and including a fourth check valve in said first supply line between the third hydraulic line and the change-over valve.

4. A hydraulic operating apparatus according to claim 3, including a first derivative line communicating said third hydraulic line with said reservoir, and including a pressure-limiting valve in said first derivative line.

5. A hydraulic operating apparatus according to claim 4, including a second derivative line communicating said third hydraulic line with said reservoir, and including a throttle valve in said second derivative line.

6. A hydraulic operating apparatus according to claim 5, including a blockable line which communicates said second hydraulic line with said second derivative line.

7. A hydraulic operating apparatus according to claim 6, wherein said first check valve is located in said second hydraulic line, and wherein said blockable line connects with said second hydraulic line between said first check valve and said first piston-cylinder assembly.

8. A hydraulic operating apparatus according to claim 7, including a blocking element in said blockable line.

\* \* \* \* \*